(12) United States Patent
Heil et al.

(10) Patent No.: US 9,920,930 B2
(45) Date of Patent: Mar. 20, 2018

(54) THERMOPILE ASSEMBLY WITH HEAT SINK

(71) Applicant: Honeywell International Inc., Morristown, NJ (US)

(72) Inventors: David Heil, Robbinsdale, MN (US); Frederick Hazzard, Plymouth, MN (US); Ravindra Khosla, Maple Grove, MN (US)

(73) Assignee: Honeywell International Inc., Morris Plains, NJ (US)

( * ) Notice: Subject to any disclaimer, the term of this patent is extended or adjusted under 35 U.S.C. 154(b) by 280 days.

(21) Appl. No.: 14/689,896

(22) Filed: Apr. 17, 2015

(65) Prior Publication Data

US 2016/0305827 A1     Oct. 20, 2016

(51) Int. Cl.
| | | |
|---|---|---|
| *G01K 1/14* | (2006.01) | |
| *F23N 5/10* | (2006.01) | |
| *F23N 5/02* | (2006.01) | |

(52) U.S. Cl.
CPC ............. *F23N 5/102* (2013.01); *F23N 5/022* (2013.01); *G01K 1/14* (2013.01)

(58) Field of Classification Search
CPC G01K 7/02; G01K 7/22; G01K 13/02; G01K 2205/04; G01K 2013/024;
(Continued)

(56) References Cited

U.S. PATENT DOCUMENTS 2,331,718 A    10/1943  Newton
2,355,216 A *   8/1944  Guelson .................... F23Q 9/04
                                                         431/75
(Continued)

FOREIGN PATENT DOCUMENTS

CA        2158120        3/1997
CN       201772614       3/2011
(Continued)

OTHER PUBLICATIONS

Reliance Water Heaters, "Service Handbook for Standard Residential FVIR Gas Water Heaters, Models: G/LORT, G/LORS, G/LBRT, G/LBRS/ G/LBCT, G/LBCS, G/LKRT, G/LKRS, G/LKCT, G/LART, G/LARS, G/LXRT, GLQRT—Series 200/201 and Series 202/203," 44 pages, Nov. 2009.
(Continued)

*Primary Examiner* — Manish S Shah
(74) *Attorney, Agent, or Firm* — Seager, Tufte & Wickhem, LLP (57) ABSTRACT

A heat sink assembly draws heat away from the cold junction of a thermopile element to increase the thermopile's power output. In one example, the heat sink assembly includes a first thermally conductive securing mechanism, a second thermally conductive securing mechanism, and a thermally conductive tube having a first end and a second end. The first end of the thermally conductive tube is secured between the first securing mechanism and the second securing mechanism. In some cases, the first end of the thermally conductive tube may include a flanged region adjacent the first end with at least part of the flange region secured between the first securing mechanism and the second securing mechanism. The flange may help with heat transfer to the thermally conductive tube.

12 Claims, 3 Drawing Sheets

(58) Field of Classification Search
CPC .......... G01K 1/14; G01K 13/00; G01K 3/005;
G01K 3/10; G01K 7/42; G01K 7/10;
G01K 7/20; G01K 11/32; H01R 4/023;
H01R 4/029; H01R 43/28; B23K 31/02;
H02M 1/32; H02M 1/38; H02M 1/53806;
H01C 7/008; H01C 17/00; G01N 25/72;
G01N 33/02; G01R 31/2642; G01R
31/048; G01R 31/40; F23N 5/102; F23N
5/022; A47J 43/287; F16B 2/02; F16B
1/00; F16B 47/00; F16B 2001/0035;
F16M 13/02; F16M 13/022; F23Q 9/04;
G01F 1/00; H05K 7/20945; F24F
11/0012; F24F 2001/0052; F24F
2011/0093; F24F 11/022; G01J 5/004;
G01J 5/043; G01J 5/0821
See application file for complete search history.

(56) References Cited

U.S. PATENT DOCUMENTS

| | | | |
|---|---|---|---|
| 2,920,126 A | 1/1960 | Hajny | |
| 3,056,450 A * | 10/1962 | Loveland | F23Q 9/04 431/80 |
| 3,272,432 A | 9/1966 | Davidson | |
| 3,620,849 A * | 11/1971 | Thompson | G01K 1/14 374/E1.018 |
| 3,709,740 A * | 1/1973 | Kenyon | G01K 1/14 374/E1.018 |
| 3,759,279 A | 9/1973 | Smith, Jr. | |
| 3,833,428 A | 9/1974 | Snyder et al. | |
| 3,847,350 A | 11/1974 | Thompson | |
| 3,849,350 A | 11/1974 | Matsko | |
| 3,909,816 A | 9/1975 | Teeters | |
| 3,948,439 A | 4/1976 | Heeger | |
| 4,127,380 A | 11/1978 | Straitz, III | |
| 4,131,413 A | 12/1978 | Ryno | |
| 4,177,034 A * | 12/1979 | Jones | F23Q 9/04 431/264 |
| 4,221,557 A | 9/1980 | Jalics | |
| 4,305,547 A | 12/1981 | Cohen | |
| 4,324,207 A | 4/1982 | Leuthard | |
| 4,324,944 A | 4/1982 | Weihrich et al. | |
| RE30,936 E | 5/1982 | Kmetz et al. | |
| 4,333,002 A | 6/1982 | Kozak | |
| 4,421,062 A | 12/1983 | Padilla, Sr. | |
| 4,438,728 A | 3/1984 | Fracaro | |
| 4,467,178 A | 8/1984 | Swindle | |
| 4,483,672 A | 11/1984 | Wallace et al. | |
| 4,507,938 A | 4/1985 | Hama et al. | |
| 4,508,261 A | 4/1985 | Blank | |
| 4,511,790 A | 4/1985 | Kozak | |
| 4,568,821 A | 2/1986 | Boe | |
| 4,588,875 A | 5/1986 | Kozak et al. | |
| 4,638,789 A | 1/1987 | Ueki et al. | |
| 4,655,705 A | 4/1987 | Shute et al. | |
| 4,692,598 A | 9/1987 | Yoshida et al. | |
| 4,696,639 A | 9/1987 | Bohan, Jr. | |
| 4,734,658 A | 3/1988 | Bohan, Jr. | |
| 4,742,210 A | 5/1988 | Tsuchiyama et al. | |
| 4,770,629 A | 9/1988 | Bohan, Jr. | |
| 4,778,378 A | 10/1988 | Dolnick et al. | |
| 4,830,601 A | 5/1989 | Dahlander et al. | |
| 4,834,284 A | 5/1989 | Vandermeyden | |
| 4,906,337 A | 3/1990 | Palmer | |
| 4,965,232 A | 10/1990 | Mauleon et al. | |
| 4,977,885 A | 12/1990 | Herweyer et al. | |
| 4,984,981 A | 1/1991 | Pottebaum | |
| 4,986,468 A | 1/1991 | Deisinger | |
| 5,007,156 A | 4/1991 | Hurtgen | |
| 5,037,291 A | 8/1991 | Clark | |
| 5,077,550 A | 12/1991 | Cormier | |
| 5,103,078 A | 4/1992 | Boykin et al. | |
| 5,112,217 A | 5/1992 | Ripka et al. | |
| 5,125,068 A | 6/1992 | McNair et al. | |
| 5,126,721 A | 6/1992 | Butcher et al. | |
| 5,222,888 A | 6/1993 | Jones et al. | |
| 5,232,582 A | 8/1993 | Takahashi et al. | |
| 5,236,328 A | 8/1993 | Tate et al. | |
| 5,280,802 A | 1/1994 | Comuzie, Jr. | |
| 5,317,670 A | 5/1994 | Elia | |
| 5,391,074 A | 2/1995 | Meeker | |
| 5,424,554 A | 6/1995 | Marran et al. | |
| 5,442,157 A | 8/1995 | Jackson | |
| 5,567,143 A | 10/1996 | Servidio | |
| 5,622,200 A | 4/1997 | Schulze | |
| 5,660,328 A | 8/1997 | Momber | |
| 5,779,143 A | 7/1998 | Michaud et al. | |
| 5,791,890 A | 8/1998 | Maughan | |
| 5,797,358 A | 8/1998 | Brandt et al. | |
| 5,857,845 A | 1/1999 | Paciorek | |
| 5,896,089 A | 4/1999 | Bowles | |
| 5,968,393 A | 10/1999 | Demaline | |
| 5,971,745 A | 10/1999 | Bassett et al. | |
| 5,975,884 A | 11/1999 | Dugger | |
| 6,053,130 A | 4/2000 | Shellenberger | |
| 6,059,195 A | 5/2000 | Adams et al. | |
| 6,069,998 A | 5/2000 | Barnes et al. | |
| 6,075,923 A | 6/2000 | Wu | |
| 6,080,971 A | 6/2000 | Seitz et al. | |
| 6,208,806 B1 | 3/2001 | Langford | |
| 6,212,894 B1 | 4/2001 | Brown et al. | |
| 6,236,321 B1 | 5/2001 | Troost, IV | |
| 6,261,087 B1 | 7/2001 | Bird et al. | |
| 6,271,505 B1 | 8/2001 | Henderson | |
| 6,286,464 B1 | 9/2001 | Abraham et al. | |
| 6,293,471 B1 | 9/2001 | Stettin et al. | |
| 6,299,433 B1 | 10/2001 | Gauba et al. | |
| 6,350,967 B1 | 2/2002 | Scott | |
| 6,351,603 B2 | 2/2002 | Waithe et al. | |
| 6,363,218 B1 | 3/2002 | Lowenstein et al. | |
| 6,371,057 B1 | 4/2002 | Henderson | |
| 6,375,087 B1 | 4/2002 | Day et al. | |
| 6,390,029 B2 | 5/2002 | Alphs | |
| RE37,745 E | 6/2002 | Brandt et al. | |
| 6,410,842 B1 | 6/2002 | McAlonan | |
| 6,455,820 B2 | 9/2002 | Bradenbaugh | |
| 6,553,946 B1 | 4/2003 | Abraham et al. | |
| 6,560,409 B2 | 5/2003 | Troost, IV | |
| 6,606,968 B2 | 8/2003 | Iwamam et al. | |
| 6,629,021 B2 | 9/2003 | Cline et al. | |
| 6,631,622 B1 | 10/2003 | Ghent et al. | |
| 6,633,726 B2 | 10/2003 | Bradenbaugh | |
| 6,684,821 B2 | 2/2004 | Lannes et al. | |
| 6,701,874 B1 | 3/2004 | Schultz et al. | |
| 6,732,677 B2 | 5/2004 | Donnelly et al. | |
| 6,794,771 B2 | 9/2004 | Orloff | |
| 6,795,644 B2 | 9/2004 | Bradenbaugh | |
| 6,835,307 B2 | 12/2004 | Talbert et al. | |
| 6,845,110 B2 | 1/2005 | Gibson | |
| 6,861,621 B2 | 3/2005 | Ghent | |
| 6,880,493 B2 | 4/2005 | Clifford | |
| 6,920,377 B2 | 7/2005 | Chian | |
| 6,934,862 B2 | 8/2005 | Sharood et al. | |
| 6,936,798 B2 | 8/2005 | Moreno | |
| 6,955,301 B2 | 10/2005 | Munsterhuis et al. | |
| 6,959,876 B2 | 11/2005 | Chian et al. | |
| 6,967,565 B2 | 11/2005 | Lingemann | |
| 6,973,819 B2 | 12/2005 | Ruhland et al. | |
| 6,995,301 B1 | 2/2006 | Shorrosh | |
| 7,032,542 B2 | 4/2006 | Donnelly et al. | |
| 7,065,431 B2 | 6/2006 | Patterson et al. | |
| 7,076,373 B1 | 7/2006 | Munsterhuis et al. | |
| 7,088,238 B2 | 8/2006 | Karaoguz et al. | |
| 7,103,272 B2 | 9/2006 | Baxter | |
| 7,117,825 B2 | 10/2006 | Phillips | |
| 7,137,373 B2 | 11/2006 | Seymour, II et al. | |
| 7,162,150 B1 | 1/2007 | Welch et al. | |
| 7,167,813 B2 | 1/2007 | Chian et al. | |
| 7,221,862 B1 | 5/2007 | Miller et al. | |
| 7,252,502 B2 | 8/2007 | Munsterhuis | |
| 7,255,285 B2 | 8/2007 | Troost et al. | |
| 7,298,968 B1 | 11/2007 | Boros et al. | |

(56) References Cited

U.S. PATENT DOCUMENTS

| | | | |
|---|---|---|---|
| 7,317,265 B2 | 1/2008 | Chian et al. |
| 7,346,274 B2 | 3/2008 | Bradenbaugh |
| 7,373,080 B2 | 5/2008 | Baxter |
| 7,380,522 B2 | 6/2008 | Krell et al. |
| 7,432,477 B2 | 10/2008 | Teti |
| 7,434,544 B2 | 10/2008 | Donnelly et al. |
| 7,469,550 B2 | 12/2008 | Chapman, Jr. et al. |
| 7,506,617 B2 | 3/2009 | Paine |
| 7,526,539 B1 | 4/2009 | Hsu |
| 7,561,057 B2 | 7/2009 | Kates |
| 7,603,204 B2 | 10/2009 | Patterson et al. |
| 7,613,855 B2 | 11/2009 | Phillips et al. |
| 7,623,771 B2 | 11/2009 | Lentz et al. |
| 7,634,976 B2 | 12/2009 | Gordon et al. |
| 7,672,751 B2 | 3/2010 | Patterson et al. |
| 7,712,677 B1 | 5/2010 | Munsterhuis et al. |
| 7,744,007 B2 | 6/2010 | Beagen et al. |
| 7,744,008 B2 | 6/2010 | Chapman, Jr. et al. |
| 7,770,807 B2 | 8/2010 | Robinson et al. |
| 7,798,107 B2 | 9/2010 | Chian et al. |
| 7,804,047 B2 | 9/2010 | Zak et al. |
| 7,902,959 B2 | 3/2011 | Yamada et al. |
| 7,932,480 B2 | 4/2011 | Gu et al. |
| 7,934,662 B1 | 5/2011 | Jenkins |
| 7,970,494 B2 | 6/2011 | Fima |
| 7,974,527 B1 | 7/2011 | Adler |
| 8,061,308 B2 | 11/2011 | Phillips |
| 8,074,894 B2 | 12/2011 | Beagen |
| 8,083,104 B2 | 12/2011 | Roetker et al. |
| 8,111,980 B2 | 2/2012 | Bradenbaugh |
| 8,165,726 B2 | 4/2012 | Nordberg et al. |
| 8,204,633 B2 | 6/2012 | Harbin, III et al. |
| 8,245,987 B2 | 8/2012 | Hazzard et al. |
| 8,322,312 B2 | 12/2012 | Strand |
| 8,360,334 B2 | 1/2013 | Nold et al. |
| 8,367,984 B2 | 2/2013 | Besore et al. |
| 8,422,870 B2 | 4/2013 | Nelson et al. |
| 8,485,138 B2 | 7/2013 | Leeland et al. |
| 8,498,527 B2 | 7/2013 | Roetker et al. |
| 8,600,556 B2 | 12/2013 | Nesler et al. |
| 8,606,092 B2 | 12/2013 | Amiran et al. |
| 8,660,701 B2 | 2/2014 | Phillips et al. |
| 8,667,112 B2 | 3/2014 | Roth et al. |
| 8,726,789 B2 | 5/2014 | Clark |
| 8,770,152 B2 | 7/2014 | Leeland et al. |
| 9,080,769 B2 | 7/2015 | Bronson et al. |
| 9,122,283 B2 | 9/2015 | Rylski et al. |
| 9,195,242 B2 | 11/2015 | Zobrist et al. |
| 9,228,746 B2 | 1/2016 | Hughes et al. |
| 9,249,986 B2 | 2/2016 | Hazzard et al. |
| 9,268,342 B2 | 2/2016 | Beyerle et al. |
| 9,310,098 B2 | 4/2016 | Buescher et al. |
| 2002/0099474 A1 | 7/2002 | Khesin |
| 2003/0093105 A1 | 5/2003 | Patterson et al. |
| 2004/0042772 A1 | 3/2004 | Whitford et al. |
| 2004/0079749 A1 | 4/2004 | Young et al. |
| 2006/0027571 A1 | 2/2006 | Miyoshi et al. |
| 2006/0272830 A1 | 12/2006 | Fima |
| 2007/0023333 A1 | 2/2007 | Mouhebaty et al. |
| 2007/0210177 A1 | 9/2007 | Karasek |
| 2007/0292810 A1 | 12/2007 | Maiello et al. |
| 2008/0003530 A1 | 1/2008 | Donnelly et al. |
| 2008/0023564 A1 | 1/2008 | Hall |
| 2008/0048046 A1 | 2/2008 | Wagner et al. |
| 2008/0188995 A1 | 8/2008 | Hotton et al. |
| 2008/0197206 A1 | 8/2008 | Murakami et al. |
| 2009/0117503 A1 | 5/2009 | Cain |
| 2010/0065764 A1 | 3/2010 | Canpolat |
| 2010/0163016 A1 | 7/2010 | Pan |
| 2011/0045423 A1* | 2/2011 | Young .................. F23Q 9/04 431/258 |
| 2011/0254661 A1 | 10/2011 | Fawcett et al. |
| 2011/0259322 A1 | 10/2011 | Davis et al. |
| 2011/0305444 A1 | 12/2011 | Pussell |
| 2012/0060771 A1 | 3/2012 | Brian et al. |
| 2012/0060829 A1 | 3/2012 | DuPlessis et al. |
| 2013/0104814 A1 | 5/2013 | Reyman |
| 2014/0060457 A1 | 3/2014 | Hill et al. |
| 2014/0202549 A1 | 7/2014 | Hazzard et al. |
| 2014/0203093 A1 | 7/2014 | Young et al. |
| 2014/0212821 A1 | 7/2014 | Bann et al. |
| 2015/0083384 A1 | 3/2015 | Lewis, Jr. et al. |
| 2015/0120067 A1 | 4/2015 | Wing et al. |
| 2015/0276268 A1 | 10/2015 | Hazzard et al. |
| 2015/0277463 A1 | 10/2015 | Hazzard et al. |
| 2015/0354833 A1 | 12/2015 | Kreutzman |

FOREIGN PATENT DOCUMENTS

| | | |
|---|---|---|
| CN | 201909441 | 7/2011 |
| CN | 102213489 | 10/2011 |
| CN | 203203717 U | 9/2013 |
| EP | 0356609 | 3/1990 |
| EP | 0531072 | 3/1993 |
| EP | 0699316 | 7/1999 |
| EP | 0967440 A2 | 12/1999 |
| EP | 1148298 B1 | 10/2004 |
| EP | 1621814 A2 | 2/2006 |
| EP | 1178748 | 10/2006 |
| EP | 2108140 | 6/2012 |
| FR | 2820206 | 8/2002 |
| GB | 2211331 | 6/1999 |
| JP | H 08264469 | 10/1996 |
| JP | 2005283039 | 10/2005 |
| JP | 2006084322 | 3/2006 |
| JP | 2008008548 | 1/2008 |
| JP | 2011220560 | 11/2011 |
| TW | 1431223 | 3/2014 |
| WO | 9718417 A1 | 5/1997 |
| WO | WO 2008/102263 | 8/2008 |
| WO | WO 2009/022226 | 2/2009 |
| WO | WO 2009/061622 | 5/2009 |
| WO | WO 2011/104592 | 9/2011 |

OTHER PUBLICATIONS

Honeywell International Inc., "CS8800 General Assembly, Drawing No. 50000855," 2 pages, Oct. 24, 2008.

Honeywell International Inc., Photograph of a CS8800 Thermocouple Assembly, 1 page, saved Oct. 9, 2014.

Honeywell International Inc., "Thermopile General Assembly, Drawing No. 50006914," 1 page, Jan. 12, 2006.

Honeywell International Inc., "Thermopile Assembly, Drawing No. 50006821," 1 page, Jun. 18, 2010.

Honeywell International Inc., "Thermopile Element, Drawing No. 50010166," 1 page, Apr. 1, 2005.

Johnson Controls, "K Series BASO Thermocouples, Heating Line Product Guide 435.0, Thermocouples Section, Product Bulletin K Series," 8 pages, Oct. 1998.

"Results and Methodology of the Engineering Analysis for Residential Water Heater Efficiency Standards," 101 pages, Oct. 1998.

AO Smith, "IComm Remote Monitoring System, Instruction Manual," 64 pages, Jun. 2009.

U.S. Appl. No. 14/964,392, filed Dec. 9, 2015.

U.S. Appl. No. 15/061,520, filed Mar. 4, 2016.

U.S. Appl. No. 15/166,110, filed May 26, 2016.

Filibeli et al., "Embedded Web Server-Based Home Appliance Networks," Journal of Network and Computer Applications, vol. 30, pp. 499-514, 2007.

Halfbakery.com "Hot Water Alarm," 2 pages, Sep. 4, 2002.

Heat Transfer Products Inc., "Specification for Heat Transfer Products, Inc., Vision 3 System," 2 pages, Mar. 17, 2006.

Hiller, "Dual-Tank Water Heating System Options," ASHRAE Transactions: Symposia, pp. 1028-1037, Downloaded Nov. 16, 2012.

http://nachi.org/forum/f22/dual-water-heater-installations-36034/, "Dual Water Heater Installation," 10 pages, printed Oct. 1, 2012.

http://www.whirlpoolwaterheaters.com/learn_more/energysmartelectricwaterheateroperation.aspx, link no longer functions, "Energy Smart Electric Water Heater Operation," 3 pages, prior to Nov. 13, 2012.

(56) References Cited

OTHER PUBLICATIONS http://www.whirlpoolwaterheaters.com/learn-more/eletric-water-heaters/6th-sense%E2% . . . , "Whirlpool Energy Smart Electric Water Heater, Learn More," 3 pages, printed Jan. 15, 2015.

Industrial Controls, "Basics of PID Control (Proportional+Integral+Derivative)," downloaded from https://web.archive.org/web/20110206195004/http://wwww.industrialcontrolsonline.com/training/online/basics-pid-control-proportionalintegralderivative, 4 pages, Feb. 6, 2011.

InspectAPedia, "Guide to Alternative Hot Water Sources," 6 pages, printed Oct. 1, 2012.

Lennox, "Network Control Panel, User's Manual," 18 pages, Nov. 1999.

Moog, "M3000 Control System, RTEMP 8, Remote 8-Channel Temperature Controller with CanOpen Interface," 6 pages, Nov. 2004.

Process Technology, "Troubleshooting Electric Immersion Heaters," downloaded from http://www.processtechnology.com/troubleshootheaters.html, 3 pages, Mar. 22, 2010.

Raychem, "HWAT-ECO," Tyco Thermal Control, 4 pages, 2012.

Techno Mix, "Installation-Series and Parallel," downloaded from www.chinawinds.co.uk/diy_tips/installation_series_and_parallel.html, 5 pages, printed Oct. 1, 2012.

Triangle Tube, "Prestige Solo Condensing High Efficiency Gas Boiler," 4 pages, revised Apr. 30, 2012.

\* cited by examiner

THERMOPILE ASSEMBLY WITH HEAT SINK

TECHNICAL FIELD

The present disclosure relates generally to gas-fired burners, and more particularly, to thermopiles assemblies for use in gas-fired burners.

BACKGROUND

Gas-fired appliances that cycle on and off often have a pilot burner that provides a flame whose purpose is to light the main burner of the appliance when there is a call for heat. In some cases, pilot burners include a safety control mechanism to help ensure that if the pilot flame does not initially light or is extinguished for any reason, then the supply of gas to the gas-fired appliance is cut off.

Pilot burners for gas-fired appliances often include a pilot burner tube which defines a flame opening at one end, a thermo-electric device for detecting flame and a spark source. In some instances, the combustion chambers may become extremely hot. Since the pilot burner tube typically extends into the combustion chamber, some of this heat can be conducted by the pilot burner assembly to the thermo-electric device. Especially with new more compact designs, this heat can become excessive and can reduce the reliability and/or performance of the thermo-electric device and thus the pilot burner.

SUMMARY

The present disclosure relates generally to gas-fired burner assemblies, and more particularly, to pilot burner assemblies for gas-fired appliances. In one example, a thermopile assembly may include a thermopile element that has a hot junction and a cold junction. A heat sink assembly may draw heat away from the cold junction of the thermopile element. The heat sink assembly may include a first thermally conductive securing mechanism, a second thermally conductive securing mechanism, and a thermally conductive tube having a first end and a second end. In some instances, the first end of the thermally conductive tube may include a flanged region adjacent the first end with at least part of the flange region secured between the first securing mechanism and the second securing mechanism. While not required, a first electrically conductive wire and a second electrically conductive wire may be in electrical communication with the thermopile element, and may be disposed within and extend out the second end of the thermally conductive tube.

In another example, a thermopile assembly may include a bracket having a first side and a second side and a thermopile with a hot junction and a cold junction. A securing mechanism may removably secure the thermopile to the bracket such that the hot junction of the thermopile extends in a first direction beyond the second side of the bracket. A removable heat sink may extend in a second direction beyond the first side of the bracket. The removable heat sink may be removable from the thermopile, but when installed is in thermal communication with the cold junction of the thermopile for drawing heat away from the cold junction of the thermopile. The above summary of some example embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description of various illustrative embodiments in connection with the accompanying drawings, in which.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements. The drawings, which are not necessarily to scale, are not intended to limit the scope of the disclosure. In some of the figures, elements not believed necessary to an understanding of relationships among illustrated components may have been omitted for clarity.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise. It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Figure 1:
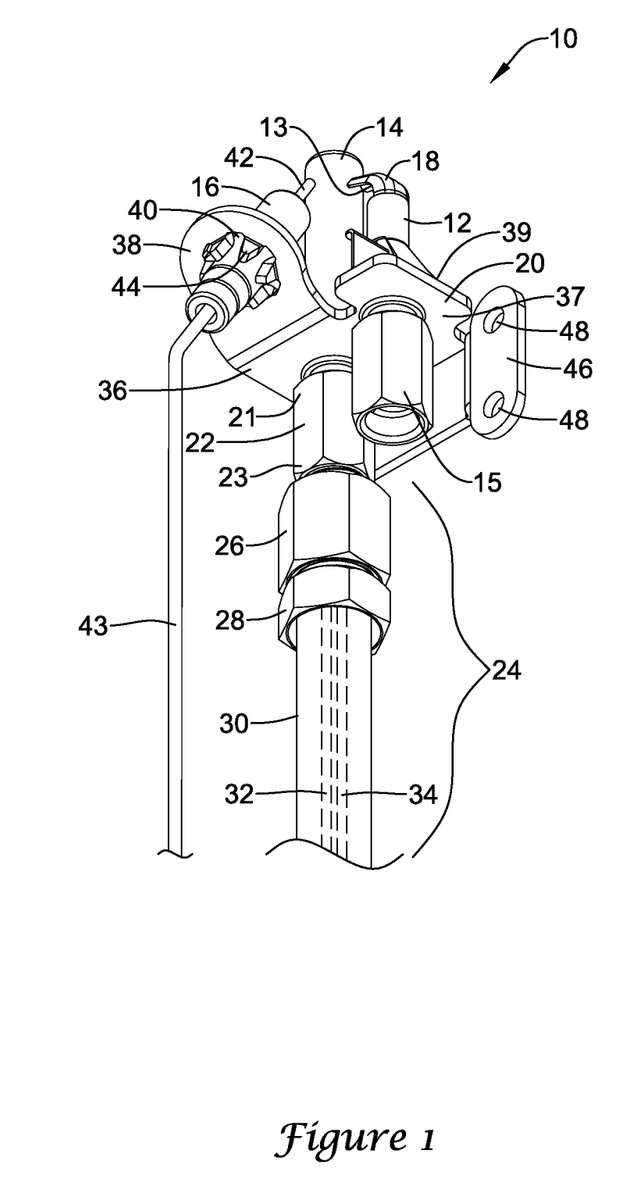
FIG. 1 is a perspective view of an illustrative pilot burner assembly.

FIG. 1 is a perspective view of an illustrative pilot burner assembly 10 for use in a gas-fired appliance (not shown). Example gas fired appliance include, but are not limited to, gas furnaces, gas boilers, and gas water heaters. In FIG. 1, the illustrative pilot burner assembly 10 includes a burner tube 12, a thermo-electric device 14 for detecting flame, and a spark source 16. The burner tube 12 defines a flame opening 13 at a first end, and a connection to a gas supply (e.g. to an output of a gas valve) at a second opposing end region 15. In the example shown, the first end of the burner tube 12 includes a hood 18 disposed over or formed with the burner tube 12 for directing the flame towards a thermo-electric device 14.

The thermo-electric device 14 may, for example, be a thermopile. It is contemplated that the thermo-electric device 14 may be any suitable thermoelectric device including a thermocouple or thermopile, as desired. A thermopile is a device that converts thermal energy into electrical energy. It is composed of two or more thermocouples either connected in series. When a flame is present at the flame opening 13 of the burner tube 12, the flame (and heat from the flame) is directed to the body of the thermo-electric device 14, sometimes with the aid of the hood 18. In response, the thermo-electric device 14 converts that heat into an electrical signal such as current. The electrical signal may be directed to a gas valve that supplies gas to a corresponding gas fired appliance. The thermo-electric device 14 may supply to the gas valve and control electronics. If there is insufficient voltage from the thermo-electric device 14, the control electronics and the gas valve may not be able to function properly. A lack of sufficient current from the thermo-electric device 14, may also indicate a lack of a pilot flame in pilot burner assembly 10. The lack of current may be used to disable the gas valve. In this way, the pilot burner 10 may provide an interlock safety mechanism for the flow of gas to the gas fired appliance.

In the example of FIG. 1, the burner tube 12 is positioned generally parallel to the thermo-electric device 14, although this is not required. This assembly orientation may be maintained using a bracket 20. The bracket 20 may include a first plate or portion 36 having a first side 37 and a second side 39. In some cases, the burner tube 12 and the thermo-electric device 14 may extend though the first plate or portion 36 and away from the second side 39 as shown.

The thermo-electric device 14 may include a securing mechanism or insert 22 fixedly or removably secured to the bracket 20 for removably securing the thermo-electric device 14 to the bracket 20. For example, the insert 22 may be threaded, welded, brazed, soldered, adhesively, or secured to the bracket 20 in any other suitable manner. The insert 22 may include a first end 21 and a second end 23. In some embodiments, the second end 23 of the insert 22 may include a threaded region, or other mechanism, for securing a heat sink assembly 24 adjacent to the thermo-electric device 14. The heat sink assembly 24 may be configured and positioned to draw heat from the cold junction (see below) of the thermo-electric device 14.

The burner tube 12 may also be fixedly or releasably attached to the bracket 20. In some embodiments, the second end region 15 of the burner tube 12 may be attached directly to the bracket 20 by threading, welding, brazing, soldering, gluing, etc. In some instances, the bracket 20 may include an angled plate 38 extending from the first portion 36 of the bracket 20, as shown. While the plate 38 is illustrated as angled, it is contemplated that the plate 38 may be configured to orient the spark source 16 in any suitable direction as desired. The angled plate 38 may include an aperture 40 configured to receive spark source 16. In the example show, the angled plate 38 is positioned to orient the spark source 16 towards the flame opening 13 of the burner tube 12. Spark source 16 may include a spark rod 42 extending towards the flame opening 13 of the burner tube 12. The aperture 40 in the plate 38 may include "finger" like protrusions 44 that are configured to engage the spark source 16 and maintain the spark source 16 in a desired position relative to the burner tube 12. The spark source 16 may also include an electrical conductor 43 configured to supply electricity to the spark source 16. In some cases, the electrical conductor 43 provides power to the spark source 16 and the bracket serves as ground. The bracket 20 may include another portion 46 that defines openings 48 for mounting the bracket 20 to another structure, such as a gas-fired appliance. The bracket 20 is only one example of a bracket that is suitable for maintaining a desired configuration of the pilot burner assembly 10 components. It is contemplated that any suitable bracket may be used to orient the burner tube 12, thermo-electric device 14, and/or spark source 16, as desired.

In the example shown, the pilot burner assembly 10 includes a heat sink assembly 24 affixed or secured to the insert 22 and in thermal communication with the thermo-electric device 14. In some instances, the insert 22 may be a stainless steel threaded insert configured to threadably and removably engage a portion of the heat sink assembly 24, although this is not required. The heat sink assembly 24 may include a first thermally conductive securing mechanism 26, a second thermally conductive securing mechanism 28, and a thermally conductive tube 30. A first electrically conductive wire 32 and a second electrically conductive wire 34 may be disposed within a lumen of the thermally conductive tube 30 and in electrical communication with the positive and negative terminals of the thermo-electric device 14. The first electrically conductive wire 32 and the second electrically conductive wire 34 may be insulated. In some cases, only one electrically conductive wire may be used, with the bracket serving as ground.

Figure 2:
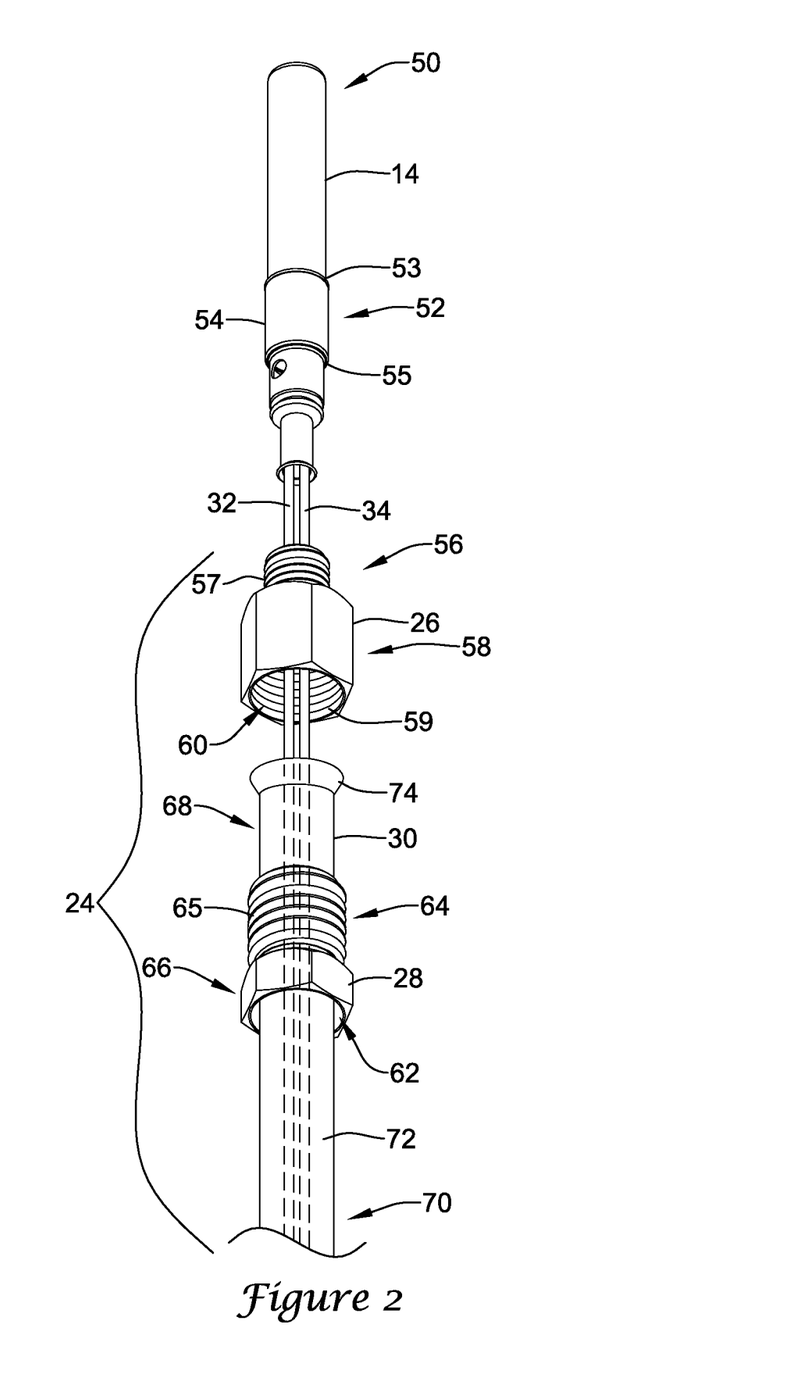
FIG. 2 is an exploded view of a portion of the illustrative pilot burner assembly of FIG. 1.
Figure 3:
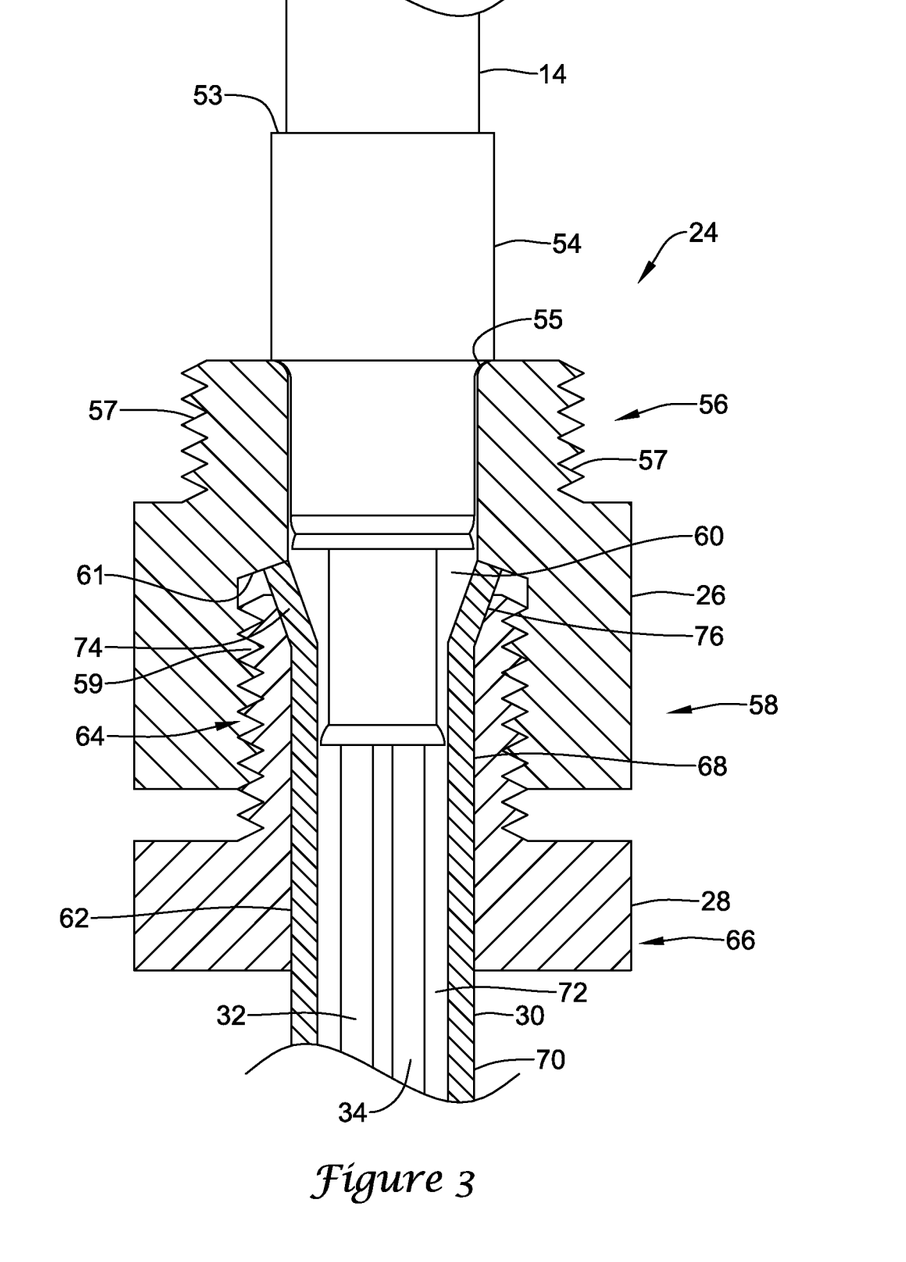
FIG. 3 is a cross-section of an illustrative heat sink assembly.

The various components of the thermo-electric device 14 and the heat sink assembly 24 will now be described in more detail with reference to FIGS. 2 and 3. FIG. 2 illustrates a partially exploded perspective view of the thermo-electric device 14 and the heat sink assembly 24. FIG. 3 is a partial cross-sectional view of the assembled heat sink assembly 24 and a side view the thermo-electric device 14 in relation to the heat sink assembly 24. In the example shown, the thermo-electric device 14 may include a first end 50 and a second end 52. The second end 52 of the thermo-electric device 14 may be surrounded by or disposed within a base member 54. The base member 54 may taper away from the second end 52 of the thermo-electric device 14, although this is not required. A first electrically conductive wire 32 and a second electrically conductive wire 34 may be electrically connected to positive and negative terminals of a thermopile in the thermo-electric device 14. The first and second electrically conductive wires 32, 34 may carry current generated by the thermopile to a gas valve that supplies gas to a corresponding gas fired appliance. The thermo-electric device 14 may be formed such that the "hot" junction(s) is adjacent the first end 50 (e.g. toward the burner) and the "cold" junction(s) is positioned adjacent to the second end 52 (away from the burner). The hot junction of the thermo-electric device 14 may extend in a first direction beyond the second side 39 of the bracket 20. In some instances, the cold junction(s) may be disposed within the portion of the thermo-electric device 14 surrounded by the base member 54, although this is not required.

The thermo-electric device 14 may be slidably disposed within the insert 22 of the bracket 20 described above. In some instances, a top portion 53 of the base member 54, or other portion of the thermo-electric device 14, may be configured to engage a portion of the insert to maintain the thermo-electric device 14 in a desired orientation. For example, the top portion 53 of the base member 54 may create a lip or edge configured to engage a mating lip or edge within the insert 22 as the first end 50 of the thermo-electric device 14 is advanced through the second end 23 towards the first end 21 of the insert 22. However, it contemplated that other structural features may be used to position and/or secure the thermo-electric device 14 within the insert 22, such as, but not limited to mating threads, a friction fit, a bayonet style locking feature, a snap lock, a tongue and groove type lock, a mating detent and groove or other features configured to engage a corresponding feature. The heat sink assembly 24 may be removably secured to the insert 22 to further secure and maintain the thermo-electric device 14, insert 22, and the heat sink assembly 24 in a fixed configuration relative to the bracket 20.

The illustrative heat sink assembly 24 includes a first thermally conductive securing mechanism 26, a second thermally conductive securing mechanism 28, and a thermally conductive tube 30. The heat sink assembly 24 may extend in a second direction, opposite the first direction of the hot junction, beyond the first side 37 of the bracket 20. The first securing mechanism 26, second securing mechanism 28 and/or tube 30 may be formed from a thermally conductive material, such as, but not limited to, brass, aluminum, aluminum brass, bronze, copper, gold, zinc, or combinations thereof. In some instances, the first securing mechanism 26, second securing mechanism 28 and/or tube 30 may all be formed of the same material. In other instances, the first securing mechanism 26, second securing mechanism 28 and/or tube 30 may be formed of different materials. In one example, the first securing mechanism 26 and the second securing mechanism 28 may be formed of brass while the tube 30 may be formed of copper.

In the example shown, the first securing mechanism 26 includes a nut, or other fastener, having a first end 56, a second end 58, and a lumen 60 extending therebetween. The lumen 60 may have a first diameter adjacent to the first end 56 and a second larger diameter adjacent to the second end 58. The lumen 60 may transition between the first diameter and the second diameter in a step-wise or abrupt manner defining a lip or ledge 61 (see FIG. 3) within the lumen 60 at an intermediate location between the first end 56 and the second end 58. The first end 56 may include a plurality of threads 57 extending around an outer surface thereof. The threads 57 may be configured to mate with and secure to the insert 22. For example, the insert 22 may include a threaded region (not explicitly shown) adjacent the second end 23 thereof configured to threadably engage the threads 57 on the outer surface of the first end 56 of the first securing mechanism 26. The first securing mechanism 26 may be sized and shaped to engage a bottom portion 55 of the base member 54, or other portion of the thermo-electric device 14, to maintain the thermo-electric device 14 in a desired orientation when the first securing mechanism 26 is engaged with the insert 22. While the first securing mechanism 26 and the insert 22 are described as threadably engaged, it is contemplated that other fixation mechanisms may be used to secure the first securing mechanism 26 and the insert 22 to one another. For example, the first securing mechanism 26 and the insert 22 may be engaged with a friction fit, a bayonet style locking feature, a snap lock, a tongue and groove type lock, a mating detent and groove or other features configured to engage a corresponding feature. It is further contemplated that the thread configurations may be reversed.

When the thermo-electric device 14 is secured within the insert 22 and/or to the bracket 20 and the first securing mechanism 26 is secured to the insert 22, a portion of the thermo-electric device 14 may be disposed within the lumen 60 of the first securing mechanism 26 such that the first end 56 of the first securing mechanism 26 is positioned adjacent to the cold junction of the thermo-electric device 14. In some instances, the first end 56 of the first securing mechanism 26 may be positioned over the cold junction, may abut the cold junction, and/or be positioned in close proximity to the cold junction. This may allow heat to transfer from the cold junction of the thermo-electric device 14 into the first securing mechanism 26. In some cases, the first end 56 of the first securing mechanism 26 is positioned within 20 millimeters, 10 millimeters, 7 millimeters, 5 millimeters or less.

The second end 58 of the first securing mechanism 26 may include a plurality of threads 59 extending around an inner surface thereof. The threads 59 may be configured to mate with and secure to a first end 64 of the second securing mechanism 28. In the example shown, the second securing mechanism 28 includes a nut, or other fastener, having a first end 64, a second end 66, and a lumen 62 extending therebetween. In the example shown, the lumen 62 has a generally constant diameter, although this is not required. The first end 64 may include a plurality of threads 65 extending around an outer surface thereof. The threads 65 may be configured to mate with and engage the threads 59 on the inside surface of the second end 58 of the first securing mechanism 26. While the first securing mechanism 26 and the second securing mechanism 28 are described as threadably engaged, it is contemplated that other fixation mechanisms may be used to secure the first securing mechanism 26 and the second securing mechanism 28 to one another. For example, the first securing mechanism 26 and the second securing mechanism 28 may be engaged with a compression or friction fit, a bayonet style locking feature, a snap lock, a tongue and groove type lock, a mating detent and groove or other features configured to engage a corresponding feature. It is further contemplated that the thread configurations may be reversed.

The heat sink assembly 24 may further include a thermally conductive tube 30, or heat sink, having a first end region 68, a second end region 70, and a lumen 72 extending therebetween. The thermally conductive tube 30 may have a length that is selected to draw a desired amount of heat from the cold junction of the thermo-electric device 14. In some instances, the thermally conductive tube 30 may have a length in the range of 3 to 7 inches, although this is not required. In some embodiments, the thermally conductive tube 30 may include fins or other structures positioned along the length or a portion of the length of the tube 30 to increase the surface area of the thermally conductive tube 30. This may allow for additional heat transfer for a given length of the thermally conductive tube 30. The first electrically conductive wire 32 and the second electrically conductive wire 34 may be disposed within and extend through the lumen 72 of the thermally conductive tube 30 and may be in electrical communication with the positive and negative terminals of the thermo-electric device 14.

It is further contemplated that the thermally conductive tube 30 may include a plurality of holes or apertures extending through the wall of the tube 30. This may draw cool air from an open end of the tube 30 adjacent to the second end region 72 up through the tube 30 and out the holes. The cool air may be drawn in by convection and would cool the tube 30. This may lower the temperature of the cold junctions and work in combination with the heat sink assembly 24 to increase the cooling effect of the heat sink and increase the power output of the thermo-electric device 14. However, this is not required In some instances, the thermally conductive tube 30 may have a first cross-sectional diameter adjacent the first end region 68 and a second smaller cross-sectional diameter adjacent the second end region 70. For example, in the example shown, the first end region 68 of the thermally conductive tube 30 includes a generally flanged or flared region 74 having a larger cross-sectional diameter than the remainder of the tube 30. It is contemplated that the angle of the flanged region 74 relative to a longitudinal axis of the thermally conductive tube 30 may vary as desired to increase or decrease the surface area of the tube 30 in contact with the first and/or second securing mechanisms 26, 28. For example, a larger angle of the flanged region 74 relative to the longitudinal axis of the thermally conductive tube 30 may increase the amount of surface area of the tube 30 contacting at least the first securing mechanism 26, which may increase the heat transfer rate to the thermally conductive tube 30. The flanged region 74 may be larger than the cross-sectional area of the lumen 62 of the second securing mechanism 28. This may allow the second end region 70 and portions of the first end region 68 to be slidably disposed within the second securing mechanism 28 while providing a mechanical stop or physical engagement between the flanged end 74 and the first end 64 of the second securing mechanism 28.

The heat sink assembly 24 may be removable from the thermo-electric device 14 and/or the bracket 20. However, when assembled and/or installed, the heat sink should be in thermal communication with the cold junction of the thermo-electric device 14 to help draw heat way from the cold junction. The heat sink assembly 24 may be assembled by advancing the second end region 70 of the thermally conductive tube 30 through the first end 64 and towards the second end 66 of the second securing mechanism 28 until the flanged region 74 abuts the first end 64 of the second securing mechanism 28. In some instances, the lumen 62 of the second securing mechanism 28 may have a flared region 76 sized and shaped to generally mate with the flanged region 74 of the tube 30, although this is not required. Alternatively, or additionally, the flanged region 74 may rest against or abut an end surface of the first end 64. The first end 64 of the second securing mechanism 28 may be threadably engaged with the second end 58 of the first securing mechanism 26. The threads 59, 65 of the first and second securing mechanisms 26, 28 may be sized and/or shaped such that the flanged region 74 of the thermally conductive tube 30 is brought into contact with the lip 61 of the first securing mechanism 26, as best shown in FIG. 3. Alternatively, the thermally conductive tube 30 may be placed within the lumen 60 of the first securing mechanism 26, and the second securing mechanism 28 may be subsequently advanced over the tube 30 and secured to the first securing mechanism 26.

When the first securing mechanism 26 and the second securing mechanism 28 are secured to one another, a portion of the first end region 68 of the thermally conductive tube 30, such as the flanged region 74, is secured directly between the lip 61 of the first securing mechanism 26 and the first end 64 of the second securing mechanism 28 without any intervening structure or housings such that there is direct physical contact and good thermal communication between both the first securing mechanism 26 and the thermally conductive tube 30 and the second securing mechanism 28 and the thermally conductive tube 30. This arrangement may increase heat transfer from the cold junction of the thermo-electric device 14 to the first securing mechanism 26 towards and into the thermally conductive tube 30. As noted above, the first securing mechanism 26, the second securing mechanism 28, and the thermally conductive tube 30 may be formed from materials having a relatively high thermal conductivity. This configuration extracts heat from the cold junction of the thermo-electric device 14 and distributes the heat over the length of the thermally conductive tube 30, which acts as a heat sink. As described above, a length of the thermally conductive tube 30 may be selected to distribute and dissipate a desired amount of heat. It is contemplated that the illustrative heat sink assembly 24 may lower the temperature at the cold junction of the thermo-electric device by 100° Fahrenheit or more over a conventional pilot burner assembly. This may increase the reliability and/or performance of the thermo-electric device, especially in more compact burner designs that tend to run hotter. For example, lowering the temperature at the cold junction of the thermo-electric device 14 may increase the power output of the thermo-electric device 14.

As can be seen, the thermally conductive tube 30 may be removable. This may allow a manufacturer and/or installer to select a thermally conductive tube 30 that has desired characteristics for a particular application. For example, for a gas fired appliance that has a burner that runs hot, the manufacturer and/or installer may select a thermally conductive tube 30 that has a longer length and/or has longer fins to help dissipate more heat. In contrast, for a gas fired appliance that has a burner that runs cooler, the manufacturer and/or installer may select a thermally conductive tube 30 that has a shorter length with no fins since less heat will need to be dissipated. The remaining components may remain the same. In some cases, this may help reduce the number of SKU's that the manufacturer and/or installer needs to carry.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A thermopile assembly, comprising:
   a thermopile element including a hot junction and a cold junction;
   a first thermally conductive securing mechanism;
   a second thermally conductive securing mechanism; and
   a thermally conductive tube having a first end and a second end, the first end of the thermally conductive tube comprises a flanged region adjacent the first end with at least part of the flanged region secured between the first thermally conductive securing mechanism and the second thermally conductive securing mechanism.

2. The thermopile assembly of claim 1, wherein the first thermally conductive securing mechanism is positioned adjacent to the cold junction.

3. The thermopile assembly of claim 1, further comprising a first electrically conductive wire and a second electrically conductive wire in electrical communication with the thermopile element disposed within the thermally conductive tube.

4. The thermopile assembly of claim 1, wherein the thermally conductive tube is directly secured between and engages the first thermally conductive securing mechanism and the second thermally conductive securing mechanism.

5. The thermopile assembly of claim 1, wherein the first thermally conductive securing mechanism comprises a nut having a first end and a second end and a lumen extending between the first end and the second end.

6. The thermopile assembly of claim 5, wherein the lumen of the first thermally conductive securing mechanism has a first diameter adjacent the first end and a second diameter adjacent the second end, the second diameter larger than the first diameter.

7. The thermopile assembly of claim 6, wherein the lumen of the first thermally conductive securing mechanism transitions from the first diameter to the second diameter in a step-wise manner defining a lip within the lumen at an intermediate location between the first end and the second end.

8. The thermopile assembly of claim 7, wherein the first thermally conductive securing mechanism further comprises a first threaded region adjacent to the first end disposed about an outer surface of the first thermally conductive securing mechanism and a second threaded region adjacent to the second end disposed with the lumen of the first thermally conductive securing mechanism.

9. The thermopile assembly of claim 8, wherein the second thermally conductive securing mechanism comprises a nut having a first end, a second end and a lumen extending between the first end and the second end.

10. The thermopile assembly of claim 9, wherein the second thermally conductive securing mechanism further comprises a first threaded region adjacent to the first end and disposed about an outer surface of the second thermally conductive securing mechanism.

11. The thermopile assembly of claim 10, wherein the first threaded region of the second thermally conductive securing mechanism is configured to threadably engage the second threaded region of the first thermally conductive securing mechanism.

12. The thermopile assembly of claim 11, wherein the first end of the thermally conductive tube is secured between the first end of the second thermally conductive securing mechanism and the lip of the first thermally conductive securing mechanism.

* * * * *